UNITED STATES PATENT OFFICE.

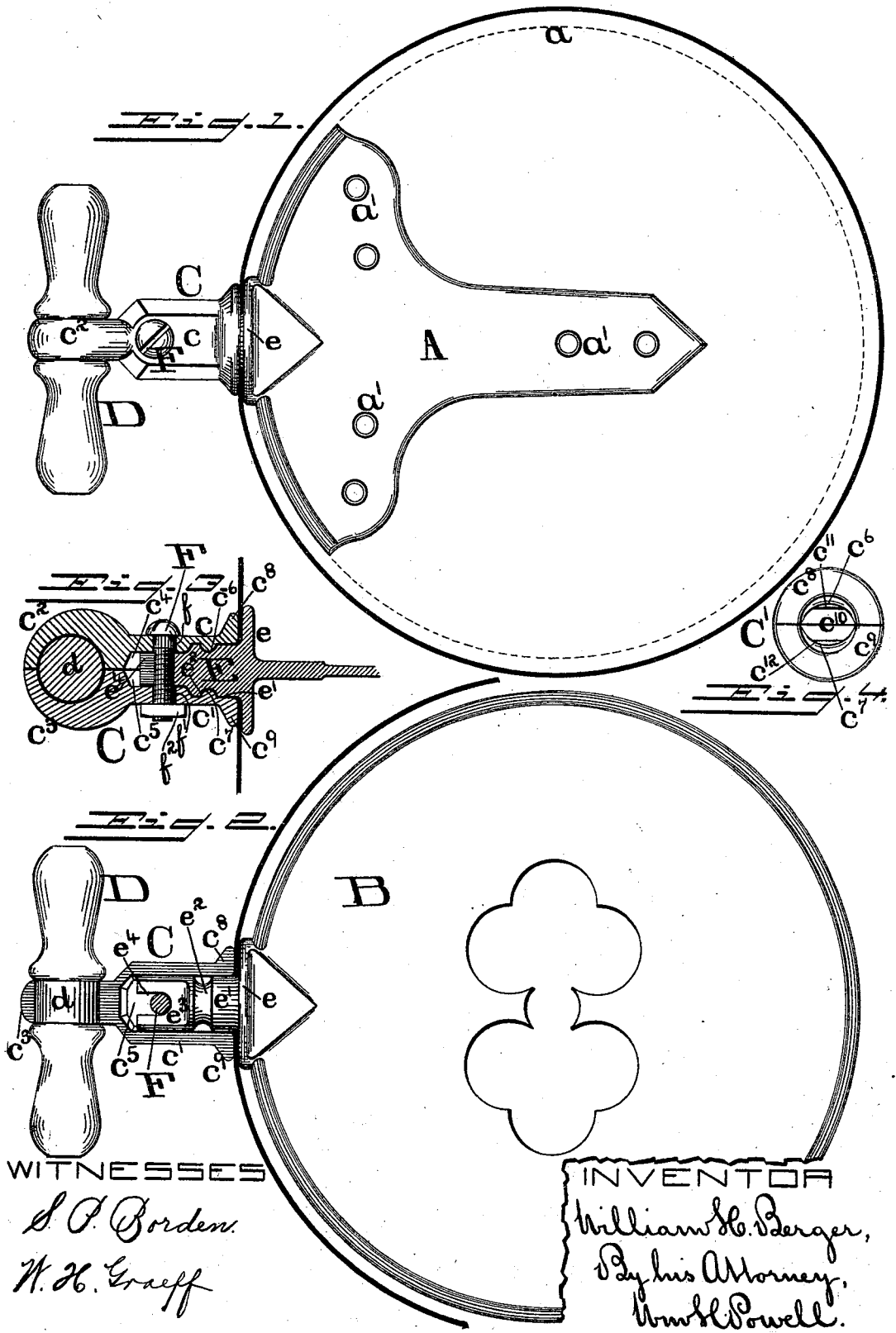

WILLIAM H. BERGER, OF WYNCOTE, PENNSYLVANIA.

DAMPER OR DAMPER-CLIP.

SPECIFICATION forming part of Letters Patent No. 516,464, dated March 13, 1894.

Application filed October 9, 1893. Serial No. 487,640. (No model.)

*To all whom it may concern:*

Be it known that I, WILLIAM H. BERGER, a citizen of the United States, residing at Wyncote, in the county of Montgomery and State of Pennsylvania, have invented certain new and useful Improvements in Dampers or Damper-Clips for Stove-Pipes, Hot-Air Flues, &c., of which the following is a specification.

My invention has relation to dampers and damper-clips for smoke pipes, hot-air flues, &c., and has for its object the provision of certain new and useful improvements therein, to the end that the same and their handles may be more perfectly adapted for conjoint operation.

My invention consists of a damper or damper-clip the relation of which with the handle thereof is fixed and neither affected by the other, in other words, the looseness with which the damper or clip turns does not affect the tightness with which the hand-piece of the handle is held in place or the firmness with which said handle is secured to said damper or clip. Rendering it unnecessary that the handle be placed in binding relation with the pipe or flue-casing in order to more effectively secure it and said hand-piece in position, thus avoiding the usual grinding action between the handle and said pipe or casing and the resultant difficulty of turning the damper or clip, permitting of a uniformly free operation of the same.

My invention also consists of a damper or damper-clip adapted for the passage of the handle fastening device through the shank of the damper or clip, or within the plane of the end of said shank instead of outside the same, for the more effective securing of the handle to said shank, yet permitting of the detachment of said handle without the removal of such fastening device or the separation of the hand-piece or any part of the handle therefrom.

My invention further consists of the details of construction and the combination of parts as hereinafter fully described and claimed and as illustrated in the accompanying drawings, wherein—

Figure 1 is a plan view of a damper-clip with my improved handle attached; Fig. 2 a plan view of a damper similarly provided, one section of the improved handle being removed. Fig. 3 is a vertical longitudinal section of the handle and shank of the clip or damper with such portion of the latter as is necessary for clearness of illustration. Fig. 4 is an end view of the handle detached.

As is well known to those skilled in the art to which my invention pertains, where the damper is of any considerable size, it is customary, for purposes of lightness, to form the damper mainly of thin sheet metal or tin, as represented in outline by the dotted line $a$ in Fig. 1, the same being secured, by rivets passed through the openings $a'$, to a cast metal clip A, which is but a fraction in area of that of the damper proper. While, on the other hand, where the damper is small the same is generally cast in one piece, as shown at B in Fig. 2, the necessity for the use of a clip being obviated. However, whether damper or damper-clip, the handle and its manner of attachment are the same in either case. With this understanding, I shall now proceed to describe my improvement in detail.

The handle C, as shown in the drawings, is composed of two similar sections $c$ $c'$ each terminating in a curved hook-like end $c^2 c^3$ and having in their meeting surfaces each a recess or depression $c^4 c^5$ with angular sides, said depressions extending inwardly a considerable distance from the inner ends of the sections and being each provided with a transverse rib $c^6 c^7$, said sections at such inner ends each having also a semicircular peripheral flange $c^8 c^9$. Said hooked ends, depressions and flanges, when brought opposite each other by the securing together of the sections $c$ $c'$ forming conjointly a circular ring or loop for retention of the central diminished portion or neck $d$ of the hand-piece D; a socket $c^{10}$, approximately square in cross-section, for reception of the shank E of the damper or clip; an internal approximately annular rib or tongue; and an annular peripheral collar or flange C' which surrounds the socket opening. The damper or clip is provided with a circular shoulder $e$ which abuts against the inner side of the smoke-pipe or flue-casing and the shank E, which extends from the center of said shoulder, projects through the usual opening in said pipe or casing, said shank at its inner end being rounded, as at $e'$, for engagement with said opening and forming a bearing upon which the damper or clip turns, and having therein an annular groove $e^2$, beyond which the shank is flattened, as at $e^3$, and at its extremity has a notch or open ended slot $e^4$ therein. Now, assuming the damper or clip to have been placed in the pipe or casing, the hand-piece D is next placed, at its neck $d$, in the hook portion of the lower section $c'$ and the hooked end of the other section placed over such neck, so that the two will encircle the latter, bringing the depressions $c^4$ $c^5$ and the bolt-openings $f f'$ in the respective sections opposite each other. The bolt F is now passed through said openings and the nut $f^2$ tightened only enough to prevent the separation of said sections which, while preventing the opening or separation of the hooked ends of the latter so much as to cause the dislodgment of the hand-piece therefrom, permits of the inner ends of the sections being spread apart sufficiently to allow of their being slipped on the shank E to such extent as to cause the engagement or latching of the ribs $c^6$ $c^7$ with the groove $e^2$ in said shank. The open end of the notch or slot in the latter affording clearance for the passage thereinto of the bolt F which, in this position, practically passes through said shank, the necessity for the removal of which, either for attaching or detaching the handle, preparatory to its insertion through the shank, being thus dispensed with. As will be observed, the bolt F is located midway between the center of the hand-piece D and the inner ends of the handle-sections, passing through the shank E intermediate its ends. The effect of which is that when said bolt is tightened, through screwing in the nut $f^2$ thereon, said sections will exert a uniform pressure upon said shank at all points and an equal pressure on said hand-piece, securing a rigid connection between the shank and handle and a perfect unity of the component parts of the latter. Obviously, with the interlocking of the ribs $c^6$ $c^7$ and the groove $e^2$ the withdrawal of the handle from the shank and, incidentally, the bolt from the notch $c^4$, is an impossibility. At the same time, said shank being flattened as aforesaid and therefore approximately square in cross-section, and the socket $c^{10}$ having angular sides and being flat at top and bottom, as shown more clearly at $c^{11}$ $c^{12}$ in Fig. 4, the turning of the shank in the handle is avoided. While the relation of the ribs in the latter and the groove in the former, with the flat of the collar C', is such as to prevent the latter from binding on the pipe or flue-casing to such extent as to prevent the free turning of the damper, which latter by its own weight rests at any adjusted point. This relation of handle and pipe or casing is invariable and requires the exercise of no care for its attainment, the simple slipping on of the handle being all that is necessary. On the other hand, the removal of said handle merely involves a slight loosening of the nut $f^2$ to allow the groove and ribs to clear each other, without effecting the separation of the hand-piece or the sections $c$ $c'$ from their normal relation.

What I claim as my invention is as follows:

The combination of a damper or damper-clip the shank of which is provided with an annular groove and has a notched end, a sectional handle on said shank the sections of which have each a rib for engagement with said groove and terminate in oppositely disposed hooks, a hand-piece encircled by the latter, and a bolt passing through said sections and the notch in the shank, substantially as specified.

In testimony whereof I have hereunto set my hand this 6th day of October, A. D. 1893.

WILLIAM H. BERGER.

Witnesses:
R. DALE SPARHAWK,
WM. H. POWELL.